(12) United States Patent
Grant et al.

(10) Patent No.: US 6,517,948 B1
(45) Date of Patent: Feb. 11, 2003

(54) INTERIOR AUTOMOTIVE PARTS FORMED FROM RIGID COPOLYESTER BLENDS MIXED WITH A LOW MOLECULAR WEIGHT COPOLYESTER SALT COMPATIBILIZER

(76) Inventors: Frank Grant, 2600 Windy Hill Dr., Pepper Pike, OH (US) 44124-4535; Lev Koller, Box 362, Columbia Valley Rd., Andover, NJ (US) 07821

( * ) Notice: Subject to any disclaimer, the term of this patent is extended or adjusted under 35 U.S.C. 154(b) by 0 days.

(21) Appl. No.: 08/959,094

(22) Filed: Oct. 28, 1997

(Under 37 CFR 1.47)

Related U.S. Application Data

(63) Continuation-in-part of application No. 08/686,636, filed on Jul. 24, 1996, now abandoned.

(51) Int. Cl.$^7$ .............................. C08L 67/02; B32B 27/36
(52) U.S. Cl. ...................... 428/480; 525/92 F; 525/173; 525/176; 525/444
(58) Field of Search ................................. 525/173, 176, 525/92 F; 428/480

(56) References Cited

U.S. PATENT DOCUMENTS

| | | | |
|---|---|---|---|
| 4,778,842 A | * 10/1988 | Taniguchi | 524/504 |
| 4,806,588 A | * 2/1989 | Fujimoto | 524/505 |
| 4,992,506 A | * 2/1991 | McCormick | 524/513 |
| 5,057,561 A | * 10/1991 | Manica | 524/68 |
| 5,252,665 A | * 10/1993 | Chiolle | 525/64 |

FOREIGN PATENT DOCUMENTS

DE     3604748 A1     8/1986

OTHER PUBLICATIONS

J. Grant, *Hackh's Chemical Dictionary*, Fourth Edition, p. 248, McGraw–Hill Book Co.

* cited by examiner

*Primary Examiner*—Patricia A. Short

(57) ABSTRACT

Polyester and copolyester blends are compatibilized by mechanical addition therewith effective compatibilizing amounts of a non-volatile, solid, low molecular weight copolymer salt of ethylene, acrylic acid, and calcium ion. Such ternary blends are homogeneous as indicated by the increase in tensile impact strength and hardness of the binary polyester and copolyester blends.

9 Claims, No Drawings

INTERIOR AUTOMOTIVE PARTS FORMED FROM RIGID COPOLYESTER BLENDS MIXED WITH A LOW MOLECULAR WEIGHT COPOLYESTER SALT COMPATIBILIZER

This is a Continuation-in-Part of U.S. patent application Ser. No. 08/686,636 filed Jul. 24, 1996, now abandoned.

TECHNICAL FIELD

The present invention relates to interior automotive parts formed from polymeric blends and more specifically it relates to blends of poly(alkylene terephthalate). Even more particularly, the present invention relates to a compatibilized blend of poly(butylene terephthalate) and at least three block segments which alternate between poly(butylene terephthalate) and poly(alkylene terephthalate) where the alkylene used is more than four carbons in length, along with a non-volatile solid low molecular weight copolymer salt compatibilizer.

BACKGROUND ART

Copolyesters are well-known commodity thermoplastic elastomers. They have been extensively used in applications where high strength and high elongation are required such as, for example, constant velocity joint boots in front-wheel-drive axles. Because copolyesters are very flexible, having a flexural modulus less than 350 Megapascals, many uses for this material require blending with a polyester to make the material stiffer.

Generally, when the amount of polyester used to stiffen the copolyester is greater than 500 Megapascals, some inhomogeneity appears in the blend. This inhomogeneity causes inconsistent performance in molded automotive parts. The location of the inhomogeneity zone in the molded part moves around randomly from part to part. Whenever the zone moves into a high stress concentration area within the part, fracture may occur because the mechanical properties in the inhomogeneity zone are inferior.

Compatibilizers for polyester and copolyester blends have not been developed in the past because when either component is in very small quantities (below the saturation point of dispersion), the blend is homogeneous.

Briefly, an essential problem in the past with the use of copolyester blends is that homogeneity was achieved by limiting to a blend that was either slightly stiffer than a copolyester or slightly more flexible than a polyester. In addition, the final composition should not rely for its performance characteristics on any components that are at all volatile, as the long periods of high temperature to which an automotive interior can be exposed will cause such components to volatilize out of the plastic.

Thus, from the foregoing, it will be seen that there is a need in the art to provide for homogeneous copolyester blends that cover the whole spectrum of stiffness with a copolyester being at the flexible extreme and a polyester at the stiff extreme. Such formulations could then be used, for example, as a stiff air bag door which would match the stiffness of the instrument panel of a full-size pickup truck, needed to withstand road vibrations. Finally, there is a need in the art to provide for a material which can compatibilize copolyester blends for homogeneity and which is non-volatile.

DISCLOSURE OF THE INVENTION

Thus, in accordance with this invention, copolyester blends are compatibilized by use of a low molecular weight compatibilizer. This compatibilizer is non-volatile and accordingly is not subject to exudation, evaporation, and condensation onto adjacent areas like interior windows and parts of an automobile. When molded, the compatibilized copolyester blend is capable of molding at a 13° C. (24° F.) lower melt temperature, making it especially beneficial for heat aging resistance.

Surprisingly and unexpectedly, and unlike other low molecular weight additives which have been added to polymer blends, the use of the present compatibilizer, instead of increasing the melt index (lowering the melt viscosity) of the copolyester blend, decreases it. The present compatibilizer is capable of increasing the hardness of the copolyester blend from about 52 Shore D to about 58–60 Shore D, even though the compatibilizer itself is softer than the copolyester blend alone.

Thus, in accordance with the present invention, a composition of matter is disclosed which comprises a blend of a polyester such as poly(butylene terephthalate), a copolyester such as segmented poly(alkylene terephthalate), and a low molecular weight polyvalent copolymer salt having a melting point not greater than 95° C. Generally, the copolymer salt will be employed in an amount effective to lower the melt index by at least 13%. The amount of copolymer generally will be more than 0.1% by weight and, typically, in the range of about 0.1% to about 10%.

DETAILED DESCRIPTION OF THE INVENTION INCLUDING THE BEST MODE OF CARRYING IT OUT

The polyester used in the practice of the invention may be any of a number of well-known polyesters prepared by condensation polymerization of a polyacid (e.g., adipic acid or anhydride, oxalic acid or anhydride, phthalic acid or anhydride, maleic acid or anhydride, or terephthalic acid or anhydride) with a polyol (e.g., ethylene glycol, propylene glycol, 1,6-hexane diol, and the like). In a preferred embodiment, the polyester is a polyalkylene terephthalate, and more preferably is poly(butylene terephthalate) (PBT). The copolyester is prepared by the condensation reaction of a polyacid and a polyol where at least one of these components is an already-formed polyester, optionally in combination with monomeric polyacids and or polyols to form a copolyester such as segmented poly(alkylene terephthalate) (PAT), as is known in the art. The low molecular weight (LMW) polyvalent copolymer salt may be prepared by first copolymerizing one or more addition-polymerizable monomers including at least one nonionic monomer (e.g., an olefinic monomer such as ethylene or propylene) and at least one saltable ionic monomer (e.g., an acid such as acrylic acid or methacrylic acid) to form a copolymer having a number average molecular weight that is preferably less than 5000. After polymerization, the copolymer is then salted with a polyvalent metal ion (e.g., calcium, barium, magnesium, antimony, and the like). The three materials discussed above may be blended in any conventional and convenient manner, as a solution, a latex, or as a melt as, for example, in a twin-screw extruder.

The amount of comonomers in forming the segmented copolyester may vary so long as the copolyester behaves like a thermoplastic elastomer. In one preferred embodiment, the segmented copolyester contains (1) about 5–90 weight percent long chain ester units derived from at least one long chain glycol having a molecular weight of about 600–6000, and at least one low molecular weight dicarboxylic acid having a molecular weight less than about 300, and (2) about 10–95 weight percent short chain ester units derived from at least one low molecular weight diol having a molecular weight of less than 250 and at least one low molecular weight dicarboxylic acid having a molecular weight of less than about 300. The amount of olefin, acid, and polyvalent metal ion employed in forming the low molecular weight copolymer salt may vary from about 10 to about 180 acid number by titration along with about 5% to about 100% neutralization as long as the compatibilizer homogenizes the polyester and copolyester blend.

While the above describes the present invention with sufficient particularity to allow those skilled in the art to make and use the invention, further exemplification follows. The examples, of course, are not intended to be limiting, but simply serve the function of even further demonstrating the present invention.

EXAMPLES

Preparation of the Blend

In order to produce the compatibilized copolyester blend using only one heat history, two methods were used.

The first method is a two step process where the copolyester and poly(butylene terephthalate) are first melt blended together at 260° C. (500 degrees Fahrenheit) to give a flexural modulus of 830 Megapascals. Then the low molecular weight copolymer salt is pelletized at the same pellet size as the copolyester blend to prevent settling. Pelletization occurs at 230 degrees Fahrenheit, at 75 rpm, through a four strand die, with a flood feed. Afterwards, the pelletized copolymer salt was tumbled at a 3% by weight along with the copolyester blend in a 50 pound capacity ribbon blender at 80 rpm for one-half hour.

The second method consists of simultaneously blending the copolyester, poly(butylene terephthalate), and the low molecular weight copolymer salt. The conditions are the same as the copolyester blend alone with the exception that cooling at the throat of the hopper on the extruder is needed to prevent the copolymer salt from bridging. The low molecular weight copolymer salt used in both methods was ethylene and acrylic acid copolymer that had an acid number of 120 and was 75% neutralized with calcium ion. Its melting point was 80 degrees Celsius.

Tensile Impact Strength Measurements

The toughness of a plastic is commonly measured by determining the amount of kinetic energy a polymer must absorb in order to fracture. The tensile impact test is a pendulum impact test which measures flexural impact strength under tension. The dimensions of the test specimens were per Type S (short-neck) as specified in ASTM D1822. It was found that the tensile impact strength of the compatibilized copolyester blend was higher than the copolyester blend alone, even though the compatibilizer is too low in molecular weight (less than 100 degrees Celsius melting point) to have any mechanical properties by itself. The compatibilized copolyester blend had a value around 160 ft-lbs./sq. in. or 337 KJ/sq. m. as compared to the copolyester blend alone of around 95 ft-lbs./sq. in. or 201 KJ/sq. m.

Industrial Exploitation

Because of the fact that blends of copolyester, poly (butylene terephthalate), and low molecular weight copolymer salt increase the impact strength beyond a copolyester blend alone, this ternary blend will find utility as a rigid air bag door. Of course, suitable adjuvants may be added to these blends such as colorants.

As has been indicated above, the blends of the present invention are easily made by mechanically admixing either sequentially or simultaneously the three polymers in any convenient manner as long as one heat history is maintained, to produce the physical blend of this invention.

While the above describes the present invention, it will, of course, be apparent that modifications are possible which pursuant to the patent statutes do not depart from the spirit and scope thereof.

We claim:

1. An automotive interior component molded from a composition (A) comprising a polyester, a copolyester, and a low molecular weight copolymer polyvalent metal salt, the low molecular weight copolymer salt having a melting point not exceeding 95 degrees Celsius, wherein the compatibilization of said composition is evidenced in that:

the tensile impact strength of said composition (A) is greater than the tensile impact strength of a composition (B) that is identical to said composition (A) except without said low molecular weight copolymer salt, the melt index of said composition (A) is lower than the melt index of a composition (B) that is identical to said composition (A) except without said low molecular weight copolymer salt, and the hardness of said composition (A) is higher than a composition (B) that is identical to said composition (A) except without said low molecular weight copolymer salt.

2. A component according to claim 1 wherein said polyester is poly(butylene terephthalate).

3. A component according to claim 1 wherein said low molecular weight copolymer salt is present in an amount of less than 10% by weight.

4. The composition of claim 3 wherein said low molecular weight copolymer salt is present in an amount between 0.1% to about 10% by weight.

5. A component according to claim 4 wherein said low molecular weight copolymer salt is formed from a mixture of ethylene and acrylic acid that is neutralized with calcium, wherein the acrylic acid is present in an amount of about 10 acid number to about 180 acid number by titration and neutralization with ion in an amount of about 5% to about 100%.

6. A component according to claim 1 wherein said low molecular weight copolymer salt comprises moieties of ethylene, acrylic acid, and calcium ion.

7. A component according to claim 1 wherein said low molecular weight copolymer salt is poly(ethylene-co-acrylic acid) partially neutralized with calcium ion.

8. A component according to claim 1 that is part of an airbag door assembly.

9. An automotive interior component coated with a film formed from a coating composition (A) comprising a polyester, a copolyester, and a low molecular weight copolymer polyvalent metal salt, the low molecular weight copolymer salt having a melting point not exceeding 95 degrees Celsius, wherein the compatibilization of said composition is evidenced in that:

the tensile impact strength of said composition (A) is greater than the tensile impact strength of a composition (B) that is identical to said composition (A) except without said low molecular weight copolymer salt, the melt index of said composition (A) is lower than the melt index of a composition (B) that is identical to said composition (A) except without said low molecular weight copolymer salt, and the hardness of said composition (A) is higher than a composition (B) that is identical to said composition (A) except without said low molecular weight copolymer salt.

* * * * *